United States Patent [19]

Wolpers et al.

[11] Patent Number: 5,452,789
[45] Date of Patent: Sep. 26, 1995

[54] DRIVE AND GUIDE ARRANGEMENT FOR ENDLESS CONVEYER

[75] Inventors: Franz M. Wolpers, Saarbrücken; Kurt Deckarm, St. Ingbert, both of Germany

[73] Assignee: PWH Anlagen & Systeme GmbH, Rohrbach, Germany

[21] Appl. No.: 204,289

[22] PCT Filed: Sep. 12, 1992

[86] PCT No.: PCT/EP92/02100

§ 371 Date: Mar. 10, 1994

§ 102(e) Date: Mar. 10, 1994

[87] PCT Pub. No.: WO93/06029

PCT Pub. Date: Apr. 1, 1993

[30] Foreign Application Priority Data

Sep. 24, 1991 [DE] Germany .......................... 41 31 676.2
Sep. 2, 1992 [DE] Germany .......................... 42 29 238.7

[51] Int. Cl.⁶ .................................................. B65G 19/00
[52] U.S. Cl. ............................................ 198/728; 198/333
[58] Field of Search ..................................... 198/329, 333, 198/728, 729, 731

[56] References Cited

U.S. PATENT DOCUMENTS 4,638,901  1/1987  Lunardi .................. 198/333 X
5,072,821  12/1991  Kruse et al. ............ 198/333 X

FOREIGN PATENT DOCUMENTS 1283612  11/1968  Germany .
2161092   6/1973  Germany .
3447218A1 6/1986  Germany .
3533774C2 4/1987  Germany .
095095    4/1991  Japan ..................... 198/333
0735675   8/1955  United Kingdom ..... 198/729
2088807A  6/1982  United Kingdom .
2104468A  3/1983  United Kingdom .
2186856   8/1987  United Kingdom ..... 198/728

OTHER PUBLICATIONS

Derwent's abstract, No. 87–141 447/20, SU 1 258 782, publ. Woche 8720 (Leningrad Textile Light).

*Primary Examiner*—James R. Bidwell
*Attorney, Agent, or Firm*—Spencer, Frank & Schneider

[57] ABSTRACT

A drive and guide arrangement for an endless conveyor includes a plurality of transport members, at least one drive wheel, and at least one chain of rubber links forming a traction member having respective end regions. The chain is reversible around the drive wheel at at least one of the end regions. The chain includes steel cable traction supports arranged within the rubber links. A first side of the chain faces the transport members and is formed with a plurality of block teeth. At least two of the block teeth have bores formed therethrough separated from one another by a predetermined distance. A second side of the chain opposite to the first side is formed with a plurality of drive teeth for engaging with the drive wheel. A guide is provided having a receiving profile and located adjacent to the chain. A plurality of connecting-and-guide members join the chain to the transport members. The connecting-and-guide members include a plurality of roller axles each being received in a respective one of the bores, and each having a first and second end. A plurality of axial-and-radial rollers are each respectively attached to the first end of a respective one of the roller axles and are each arranged to roll in the guide.

7 Claims, 5 Drawing Sheets

DRIVE AND GUIDE ARRANGEMENT FOR ENDLESS CONVEYER

BACKGROUND OF THE INVENTION

The invention relates to a drive and guide arrangement for endless conveyors which are provided with transport members, the drive and guide arrangement including at least one traction member configured as a profiled rubber-link chain having steel cable traction supports. In each of its end regions, the traction member reverses around drive discs or wheels, which are also profiled. On its side facing the transport members, the rubber-link chain is configured as block toothing, and on the opposite side it is configured as drive toothing and cooperates with the transport members by way of connecting and guide members such as rollers or the like.

Plate chains are frequently used as traction members for endless conveyors such as, for example, scraper conveyors, plate conveyors, bucket elevators, moving stairs or escalators. Such chains are machine components which require extensive maintenance, they are subject to wear and are extremely noisy. Due to the so-called polygon effect, only relatively low conveying speeds may be obtained with these chains, and at the same time, great resistance to movement of the chain and of the supporting rollers in the guides must be overcome. Steel chains having supporting and guide rollers are heavy structures and can be pretensioned only unsatisfactorily. Particularly, in side and portal scrapers, if used as endless conveyors, this results in significant chain slackening in the conveying run with negative effects on the operating behavior of the entire equipment. Heavy chains and great resistances to movement at low conveying speeds and at a predetermined conveying performance require larger and therefore also heavier transport members, such as, for example, shovels, buckets, plates, steps or the like. This in turn affects the driving power to be installed and the service weight of the endless conveyor.

DE-A 3,533,774 discloses a suspension of discharge units on scraper conveyors such as bridge-type scrapers, bucket elevators or the like, which have at least one endless driven traction member in the form of a round-link chain. This traction member cooperates by way of lugs with a plurality of discharge units arranged along the traction member, with the discharge units being offset relative to the scratch conveyor by means of further guide members. The traction member, in this case, must be arranged outside of the guide components which have the shape of a double T. If at least two juxtaposed round-link chains are used which are arranged adjacent to one another as traction members, they may be fastened alternately on consecutive discharge units. Compared to plate-link chains, round-link chains of optimum design may attain the same service life, however, the chain speed may be substantially increased. Moreover, a relatively minimal polygon effect is to be expected, resulting in the chain also being able to perform spherical movements without being damaged. Stretching of the chain, which inevitably occurs in the operating state, can be corrected by removing individual chain links. Furthermore, grinding noises of the chain may be reduced by comparison with the band chain.

Even if significant advantages are already obtained here by comparison with the plate chain, it must not be overlooked that steel members are also present here which, on the one hand, cause noises and, on the other hand, tend to wear out quickly, and the removal of chain links must be viewed as labor intensive.

DE-A 2,161,092 discloses a toothed belt equipped with tooth blocks of different heights arranged on both sides of a reinforcement. The tooth blocks of greater height are wider in the longitudinal direction of the toothed belt and form narrower gaps between adjacent flanks than the lower tooth blocks arranged on the opposite side of the reinforcement, with the height of the larger blocks being dimensioned in such a way that the use of supporting rollers and reversal wheels equipped with elevated lateral wheels is possible if suspensions are taken into consideration. The engagement of the drive wheel in the rubber chain results in a relative movement between the toothed chain and the toothed drive. This movement is converted by wear-resistant rollers into a rotational movement in the region of engagement of the wheel so that direct friction between the rubber chain and the toothed wheel is prevented. In a form-locking manner, the driving teeth engage in the roller teeth of the driving wheel, thus ensuring a slip-free drive.

DE-C 1,283,612 relates to a toothed conveyor belt for high speeds and/or high loads including conveyor means attached to the belt. The conveyor belt is provided with toothed blocks of elastic material that face each other on both sides of a reinforcement. On both sides of the reinforcement a transverse bore is recessed in each of the two superposed teeth made of elastic material. A rod is inserted in each of the transverse bores. The ends of the rods which project from the bore are connected to one another by means of parallel connector plates which project over the teeth of the toothed belt and are connected to one another in this region by a further rod which carries the conveying members.

DE-OS (German Unexamined Published Patent Application) 3,447,218 discloses a steep-incline conveyor configured as an endless discharge conveyor. The discharge units are configured as buckets which, in addition to a front clearance angle also have a side clearance angle, with the traction support being able to absorb and transfer lateral forces. The traction support can therefore be configured as a single or multi-run rubber chain having fastening members and steel cables vulcanized into it. The noise level of a rubber chain is significantly lower and the smoothness of running is significantly improved by comparison with a steel chain. Since the number of runs is adapted to the load on the steep-incline conveyor high flexibility is provided. Moreover, rubber chains do not require lubricants in the region of the traction support.

Although rubber chains are traction members that are low in noise and maintenance and do not require lubrication, they do create problems with respect to the displacement of the transport members and the guidance of their rollers. These problems occur with regard to the changing lengths of the rubber-link chain during sprocket wheel reversal, which results in jamming between the rollers and the guides and therefore cause significant wear of the components. The prior art does not provide any satisfactory solutions in this regard.

SUMMARY OF THE INVENTION

It is the object of the application to structurally configure the drive and guide arrangement of the endless conveyor as defined above in a way that makes it possible with simple means, on the one hand, for the transport members to be offset in relation to the traction members, and on the other hand, for the transport members to reverse around the drive wheels or discs securely and without jamming. The number of rollers and guide rollers is to be reduced at the same time.

The object is attained by way of the following features:

bores for receiving the axles of the rollers are set at predetermined distances into the blocks of the tooth blocks; in the region of their one free end, these axles are equipped with a combination axial/radial roller which rolls in a corresponding guide profile provided adjacent to the rubber-link chain;

the transport members are connected with the rubber-link chain by way of connector plates such that one of the connector plates interacts with the other free end of the roller axle and a further connector plate is provided in the region of the axial/radial roller;

at least one of the connector plates is connected with at least one further recess to accommodate the curve roller which is connected to the rubber-link chain and which trails the respective transport member.

The type of drive and the construction of the rubber-link chain make possible the synchronous guidance of a plurality of adjacent chains and the maintenance of predetermined speeds even under changing loads. The endless closure of the rubber-link chains is based on the technology of endless vulcanization of steel cable conveyor belts. The width of the chain is based on the traction force to be transmitted with special attention to increased protection against breakage of the chain connection.

Depending on the respective endless conveyor, the different transport members, such as, for example, scraper shovels, bucket containers, plates, steps or the like, are connected with the rubber-link chain as the traction member via screwed-on connector plates and roller axles. The axle of the roller is secured against rotation, for example, it is inserted in the connector plates by flattening the shafts and is secured against transverse movement. A thin-walled sliding bushing vulcanized into the tooth block of the rubber-link chain makes possible compensatory movements of the axle of the roller within the accommodating bore. The axial/radial roller employed accommodates both axial and radial loads in anti-friction bearings and, in this case, possibly runs in a drawn special profile or in a DIN [German Industrial Standards] support profile. The axial/radial roller is sealed to keep dirt from entering and is maintenance free. However, it may also be lubricated later through a lubricating bore in the axle of the roller. The combination of axial and radial roller in one component eliminates additional guide rollers and tracks which are commonly arranged between the traction chains, as shown in DE-OS 3,533,774. If drawn precision roller profiles are used, a quieter run of the rubber-link chain in addition to lower running resistances for the rollers may be obtained.

The connector plates for the transport members are each provided with bores to accommodate an axial/radial roller including the associated axle of the roller. The connector plate facing the guide profile is additionally provided with recesses for displacing the trailing curve roller. Both rollers are arranged offset by a predetermined dimension in relation to the axle of the associated transport member in order to accommodate, for example in scraper conveyors, the bucket torsion resulting from the scraping and conveying resistances in the roller profile of the support and guide rollers, respectively. The axial/radial roller carries, supports and guides the transport members while the trailing curve roller, which is configured merely as a radial roller and absorbs only the torsion of the transport members in cooperation with the axial/radial roller. Since the radial roller is not connected to the rubber-link chain by way of a supporting shaft, the transport members may be guided by means of drive, reversal, and deflecting discs without causing jamming during rotation.

The drive discs and wheels may be configured based on the measures of DE-OS 2,161,092. A partially open web construction of the wheel makes possible the discharge of the conveyed materials that are pressed in between the chain toothing and the drive wheel during the transport of bulk material and thus prevents the wheel toothing from clogging. Since the rubber-link chain including the steel cable traction supports can be driven via substantially smaller drive wheels than in the case of conventional plate and round-link chains, the centrifugal forces acting on the transport members and the material being conveyed are reduced and, if buckets or shovels are used as transport members, a safe emptying of the same is ensured, even if the conveying speed is increased.

The greatest advantage connected with the proposed construction is the possibility of doubling the conveying speed compared to plate systems (and to an extent also in relation to round-link chains) at a predetermined conveyor performance, and thus to use smaller transport members, such as buckets or shovels, particularly for the transport of bulk material. A lighter chain which, moreover, may be conventionally pretensioned, lighter transport members, and the elimination of additional guide rollers and associated guide tracks represent a not insignificant cutback in weight. This cutback in weight, together with the lower resistances to movement, affects the total weight and the installed driving power of the endless conveyor.

BRIEF DESCRIPTION OF THE DRAWINGS

Several exemplary embodiments of the invention are illustrated in the drawing and will be described in greater detail below. It is shown in.

DETAILED DESCRIPTION OF THE INVENTION

Figure 1:
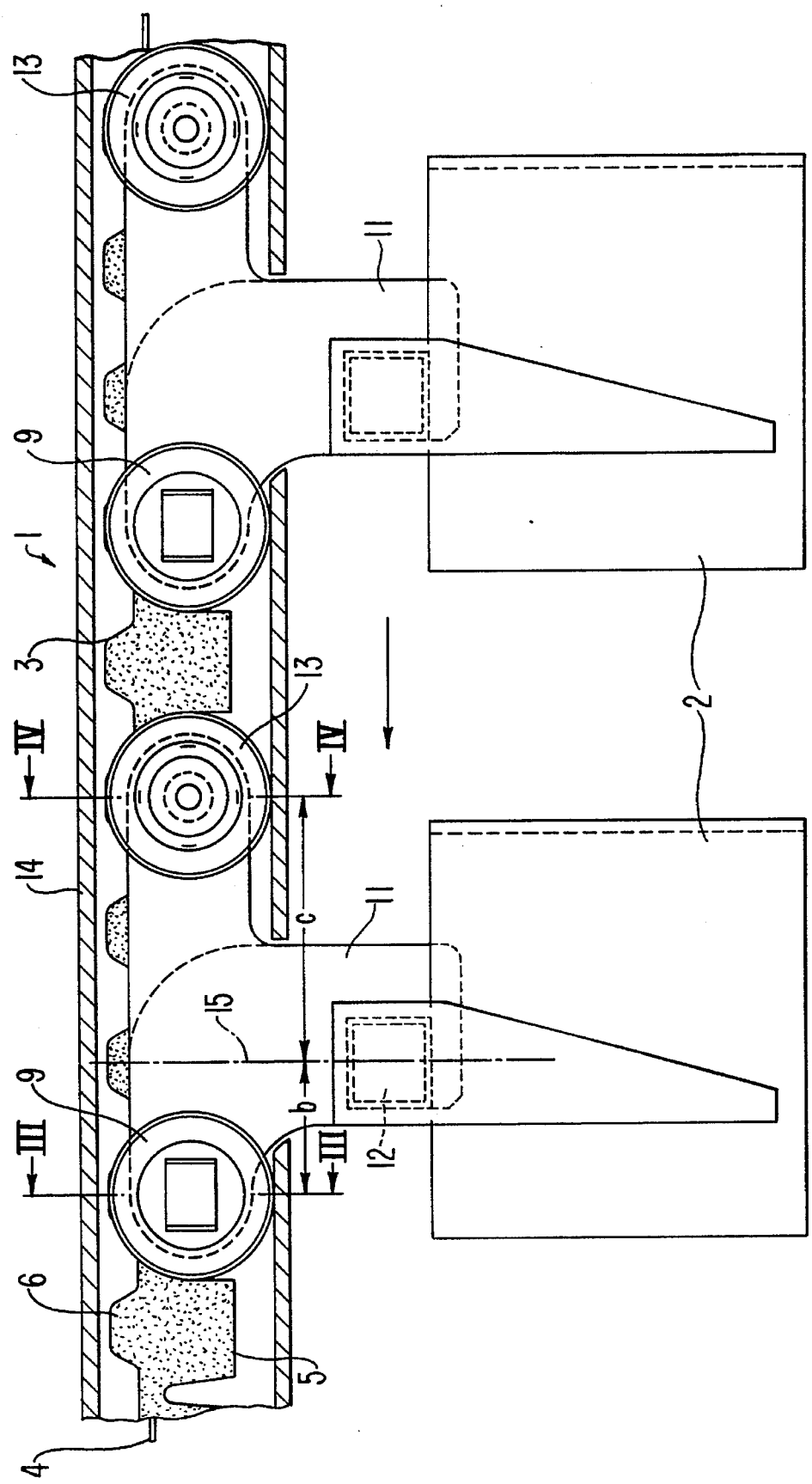
FIG. 1 a partial side view of a drive and guide arrangement for the transport members of a bridge-type scraper.
Figure 2:
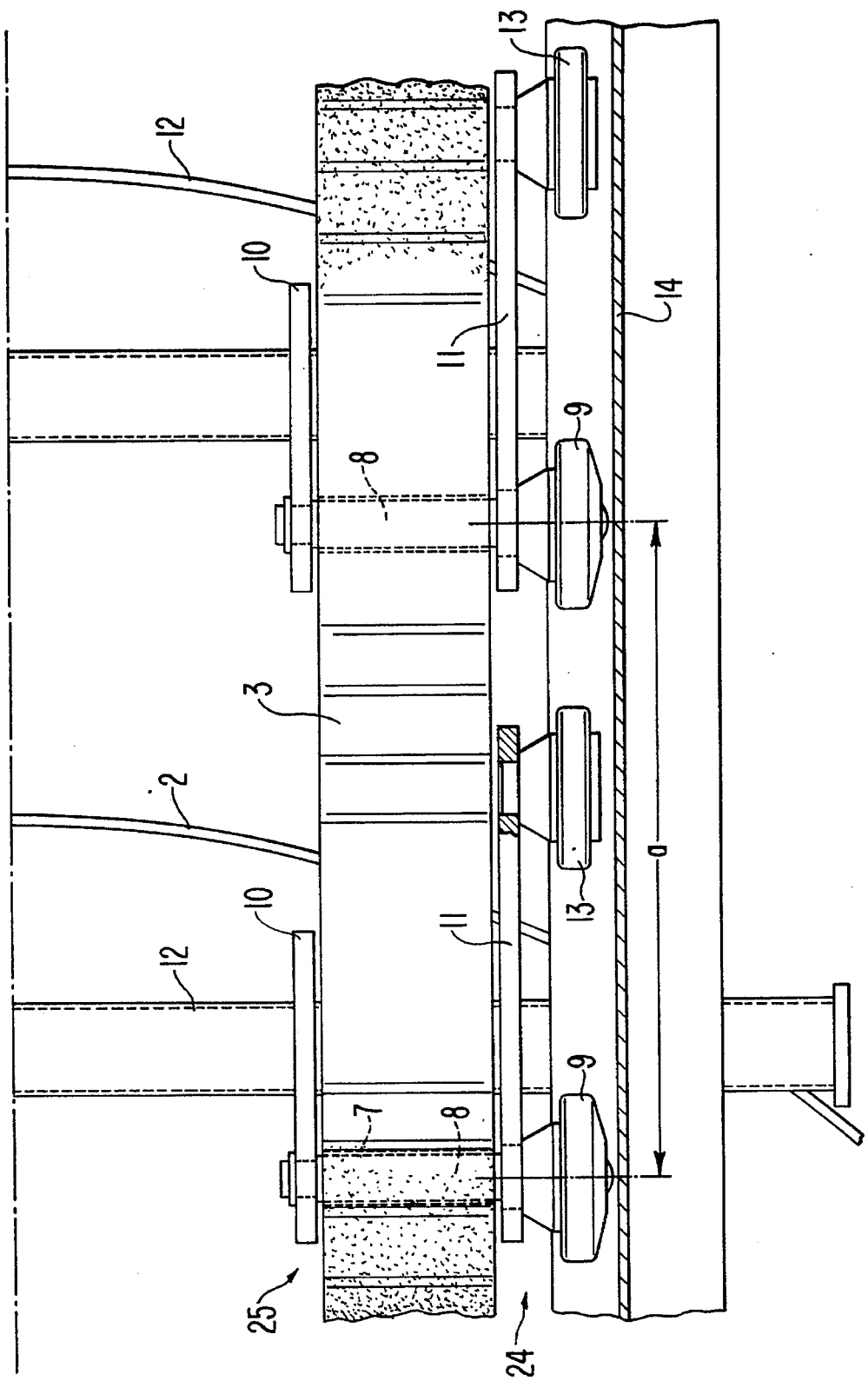
FIG. 2 a partial top view of the drive and guide arrangement according to FIG. 1.

FIGS. 1 and 2 show the drive and guide arrangement 1 according to the invention for the transport members configured as scraper shovels 2 of a bridge-type conveyor which is not further illustrated. The traction member comprises a profiled rubber-link chain 3 including steel cable traction supports 4, with the rubber-link chain 3 on its side facing the scraper shovels 2 being configured as block toothing 5 and on the opposite side as drive toothing 6. Bores 7 are made in the blocks 5 at predetermined segment distances a to accommodate a roller axle 8. In the region of its one free end (24) the roller axle 8 is provided with a combination axial/radial roller 9, which viewed in the direction of travel of the scraper shovels 2 (in the direction of the arrow), is arranged upstream. Connector plates 10, 11 are arranged at the scraper shovels 2. These connector plates are connected, on the one hand, with traverse connectors 12 holding the scraper shovels 2 and, on the other hand, with the roller axle 8 so as not to rotate. One of the connector plates 11 is extended axially and carries in the region of its free end a further curve roller in the form of a radial roller 13 which is not connected to the rubber-link chain 3.

Figure 4:
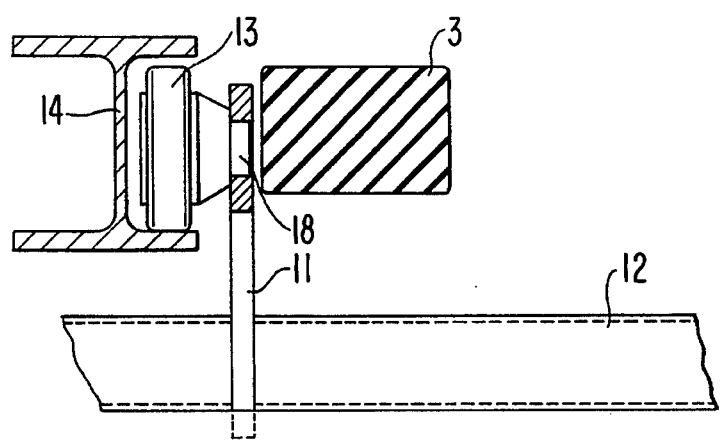
FIG. 4 a sectional view through the arrangement according to FIG. 1 along line IV—IV.

The rollers 9, 13, in this case, roll in a guide profile 14, whose cross-sectional profile is drawn approximately U-shaped (FIG. 4). The roller 13 is configured as a radial roller, since the combined axial/radial roller 9 carries, supports and guides the scraper shovels 2, while roller 13, in cooperation with the axial/radial roller 9 merely absorbs the torque of the scraper shovels 2.

Distance b of the radial/axial roller 9 to axis 15 of the scraper shovels 2 in this example is configured smaller than the distance c of the radial roller 13 from axis 15 of the scraper shovels 2, but this requirement is not obligatory. The arrangement of the radial/axial roller 9 and the radial roller 13 with distance dimension b and c, respectively, in relation to axis 15 of the scraper shovels 2 serves to absorb the torsion from scraper shovels 2, caused by scraper and conveyor resistances in guide profile 14 of the support and guide rollers.

Figure 3:
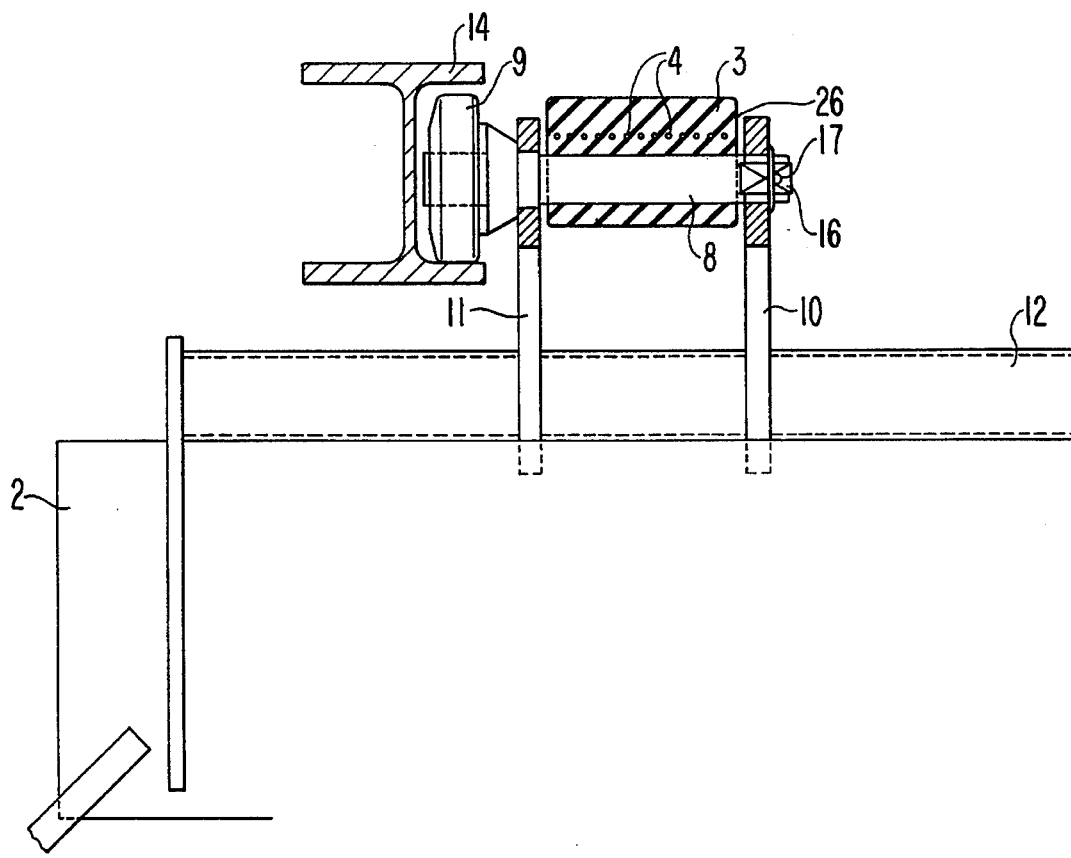
FIG. 3 a sectional view of the arrangement according to FIG. 1 along line III—III.

FIGS. 3 and 4 are sectional views of FIG. 1 along lines III—III and IV—IV, respectively.

FIG. 3 shows the rubber-link chain 3 including the steel cable traction support 4, roller axle 8, connector plates 10, 11, axial/radial roller 9 and guide profile 14. For the purpose of being displaced in connector plate 10, the roller axle 8 is provided with a flattened portion 16 in the region of its other free end 25. To prevent roller axle 8 from slipping out, it is secured by means of a bolt 17. The connector plates 10, 11 are displaced on the traverse connector 12 of the scraper shovels 2 which are only suggested here. To make possible a radial relative movement between bore 7 and roller axle 8, a thin-walled gliding bushing 26 is vulcanized into the bore 7.

FIG. 4 shows the following components: rubber-link chain 3, connector plate 11, a curve roller, which is configured as radial roller 13, and guide profile 14. The radial roller 13 is connected by way of the axle 18 to the connector plate 11 which, as already mentioned in regard to FIG. 3, is displaced on the traverse connector 12.

Figure 5:
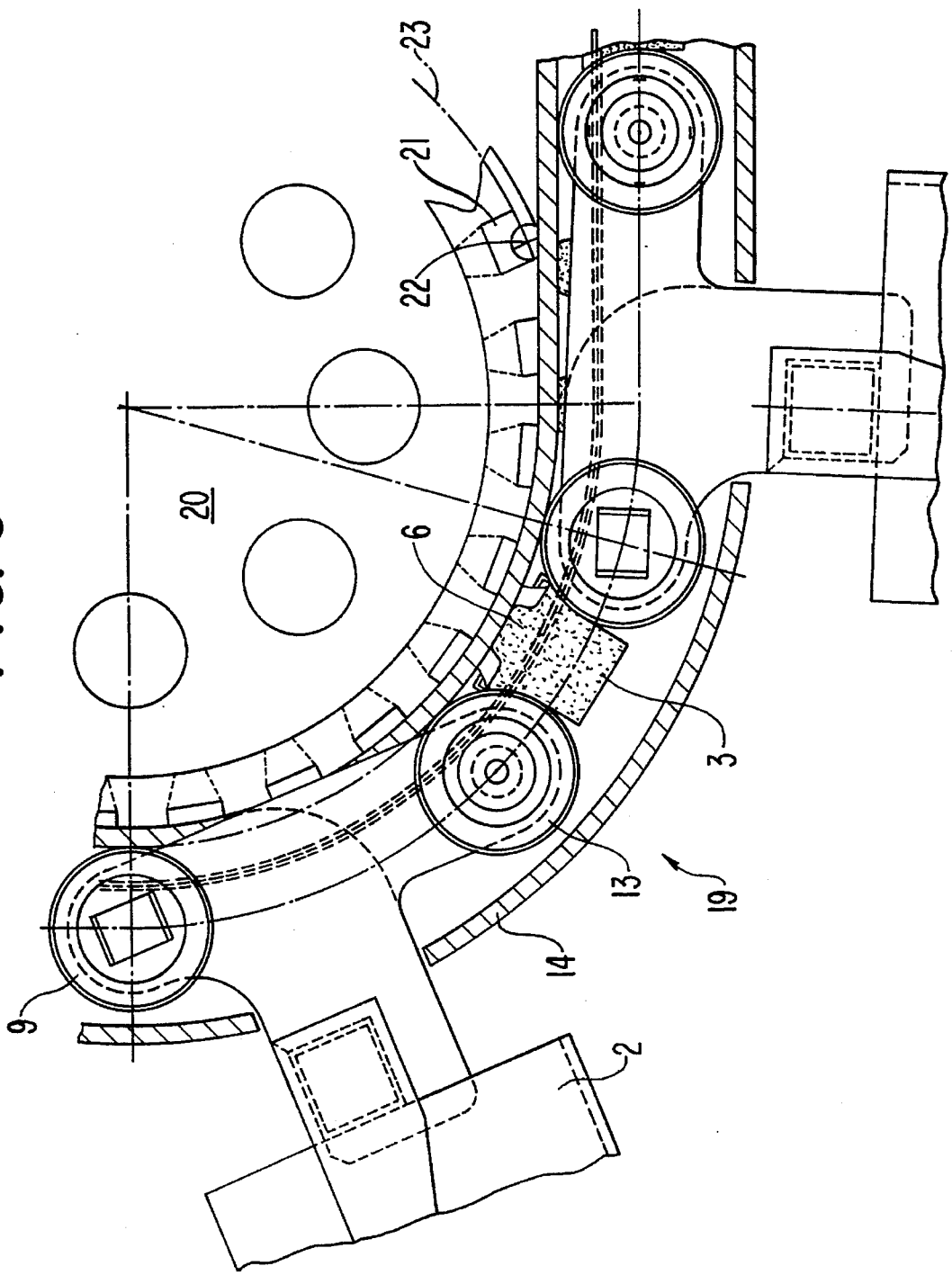
FIG. 5 a partial view of a reversing region of the arrangement according to FIG. 1.

FIG. 5 shows the reversing region 19 of the scraper shovels 2 around a drive wheel 20, which is only suggested here. At its outer circumference the drive wheel 20 is provided with recesses 21, which correspond to the distance between the drive toothing 6 of the rubber-link chain 3. During the engagement of the drive wheel 20 in the rubber-link chain 3, a relative movement results between the drive toothing 6 of the rubber-link chain 3 and recess 21. In the engagement circle 23 of the drive wheel 20, this movement is converted into a rotational movement by means of wear resistant rollers 22 such that direct friction is prevented between the drive toothing 6 of the rubber-link chain 3 and the recesses 21. Drive toothing 6 engages in the roller-toothed drive wheel 20 in a form-locking manner, ensuring a slip-free drive even during high traction load. Since the radial roller 13 is not connected with the rubber-link chain 3, no jamming occurs in the region of the guide profiles 14.

Figure 6:
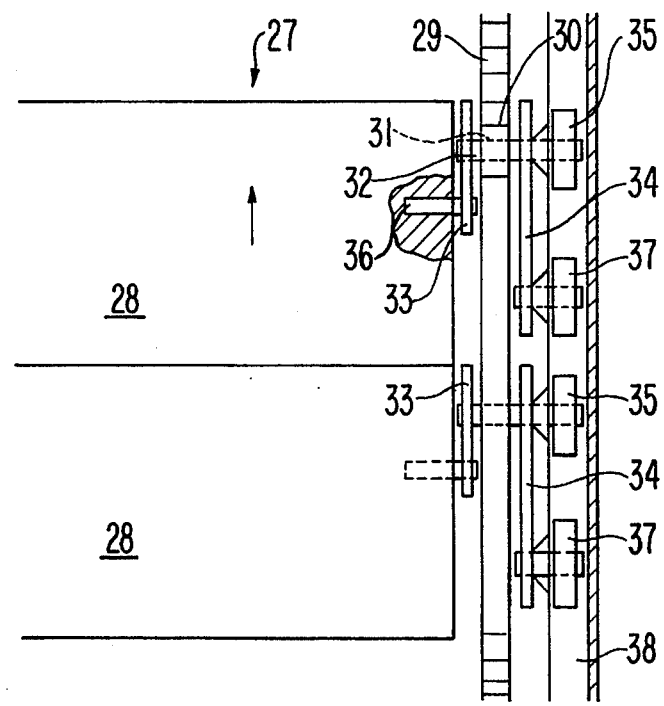
FIG. 6 a partial top view of an escalator with steps and associated drive and guide arrangement.

FIG. 6 is a partial view of an escalator 27 for passenger transport including transport members 28 which are configured as steps. A rubber-link chain 29 is also employed here as traction member analogous to FIGS. 1 to 5. Bores 31 to receive a roller axle 32 are provided at predetermined distances in blocks 30. Connector plates 33, 34 are provided adjacent to the rubber-link chain 29 with connector plate 34 being configured longer than connector plate 33. Roller axle 32, on the one hand, is displaced in connector plate 33 and, on the other hand, is provided with a combination axial/radial roller 35. The connector plate 33 is connected by way of a pin 36 with the respective transport member 28. In the region of the free end of the connector plate 34 a radial roller 37 configured as a curve roller is provided. Both the axial/radial roller 35 and the radial roller 37 are provided in corresponding guide profiles 38 in the lower region of the balustrade of the escalator 27 which is not shown in greater detail.

Figure 7:
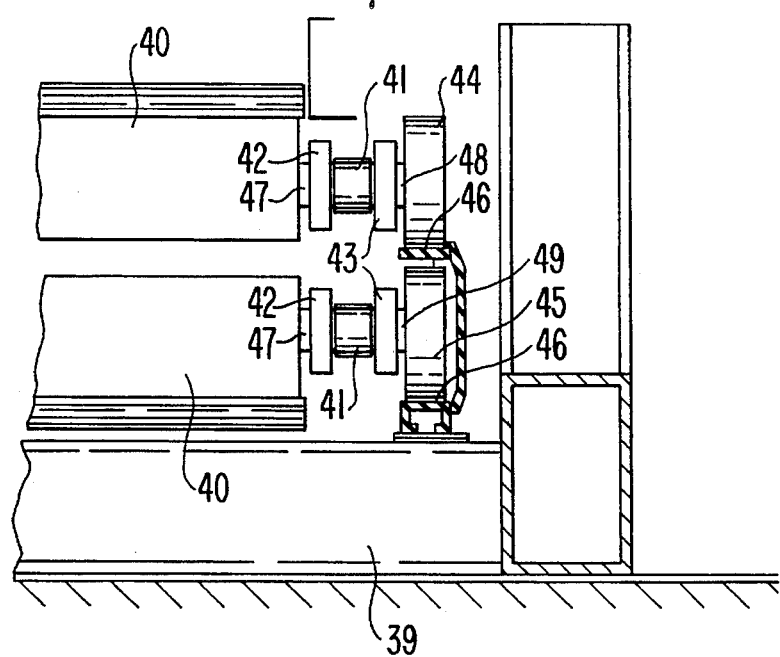
FIG. 7 a partial front view of a moving sidewalk including transport plates and the associated drive and guide arrangement.

FIG. 7 is a partial front view of a moving sidewalk 39 intended for the essentially horizontal transport of passengers and includes transport members 40 configured as plates. Shown are the rubber-link chain 41, the connector plates 42, 43, a combination axial/radial roller 44 in the transport run and a radial roller 45 as curve roller in the return run and the guide profile 46 for simultaneous guidance of the rollers 44, 45 both in the transporting and return run. The connector plate 42 is connected to the transport members 40 by way of pins 47, while the connector plates 43, on the one hand, are connected by way of roller axle 48 with the combination axial/radial roller 44 and, on the other hand, by way of pins 49 with radial roller 45.

We claim:

1. A drive and guide arrangement for an endless conveyor, comprising:

(A) a plurality of transport members;

(B) at least one drive wheel;

(C) at least one chain of rubber links forming a traction member having respective end regions, said chain being reversible around said drive wheel at at least one of the end regions, and including:

(1) a plurality of steel cable traction supports arranged within said rubber links;

(2) a first side facing said transport members and being formed with a plurality of block teeth, at least two of said block teeth having bores formed therethrough separated from one another by a predetermined distance; and (3) a second side opposite to the first side and being formed with a plurality of drive teeth for engaging with said drive wheel;

(D) a guide having a receiving profile and located adjacent to said chain; and (E) a plurality of connecting-and-guide members joining said chain to said transport members, and comprising:

(1) a plurality of roller axles each being received in a respective one of said bores, and each having a first and second end;

(2) a plurality of axial-and-radial rollers each respectively attached to the first end of a respective one of said roller axles and each arranged to roll in said guide;

(3) a plurality of first connector plates each respectively attached to the respective one of said roller axles in a region of a respective axial-and-radial roller, and a plurality of second connector plates each respectively attached to the second end of the respective one of said roller axles, at least one of said first and second connector plates being provided with a recess, said connector plates connecting said transport members to said chain; and (4) a plurality of curve rollers free from engagement with said chain and each being received within the respective recess of said connector plate and located behind said transport members relative to a direction of travel.

2. A drive and guide arrangement as defined in claim 1, wherein said curve roller each comprise a radial roller having an axle received within the recess, each said radial roller being connected exclusively to a respective one of said first connector plates.

3. A drive and guide arrangement as defined in claim 1, wherein said first connector plates each have an axial length longer than said second connector plates to form an axial extension having a respective curve roller attached thereto.

4. A drive and guide arrangement as defined in claim 1, wherein said first and second connector plates are each provided with additional recesses for accommodating respective roller axles, said roller axles being inserted into respective additional recesses and secured against rotation and transverse movements.

5. A drive and guide arrangement as defined in claim 1, wherein each respective bore includes a vulcanized thin-walled gliding bushing for receiving and guiding the respective roller axle.

6. A drive and guide arrangement as defined in claim 1, wherein said guide has one of a U and a double T-shaped cross-sectional profile.

7. A drive and guide arrangement as defined in claim 1, wherein said transport members each have an axis, and said axial-and-radial rollers and said curve rollers are each set off by a predetermined distance relative to a respective axis.

* * * * *